April 16, 1940.   C. E. ANDERSHOCK   2,197,169
CONVEYER
Filed June 26, 1939   3 Sheets-Sheet 2
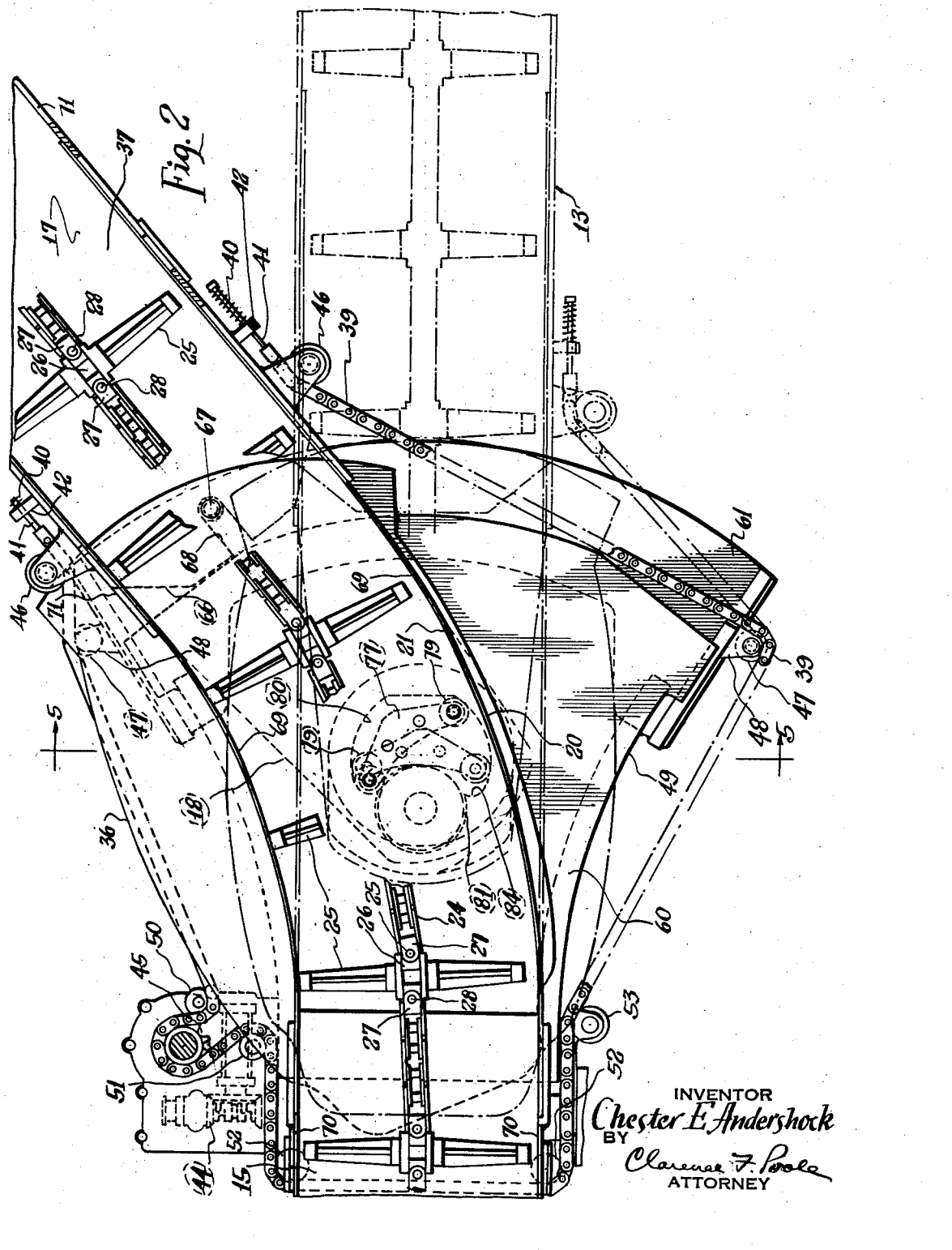
INVENTOR
Chester E. Andershock
BY Clarence F. Poole
ATTORNEY

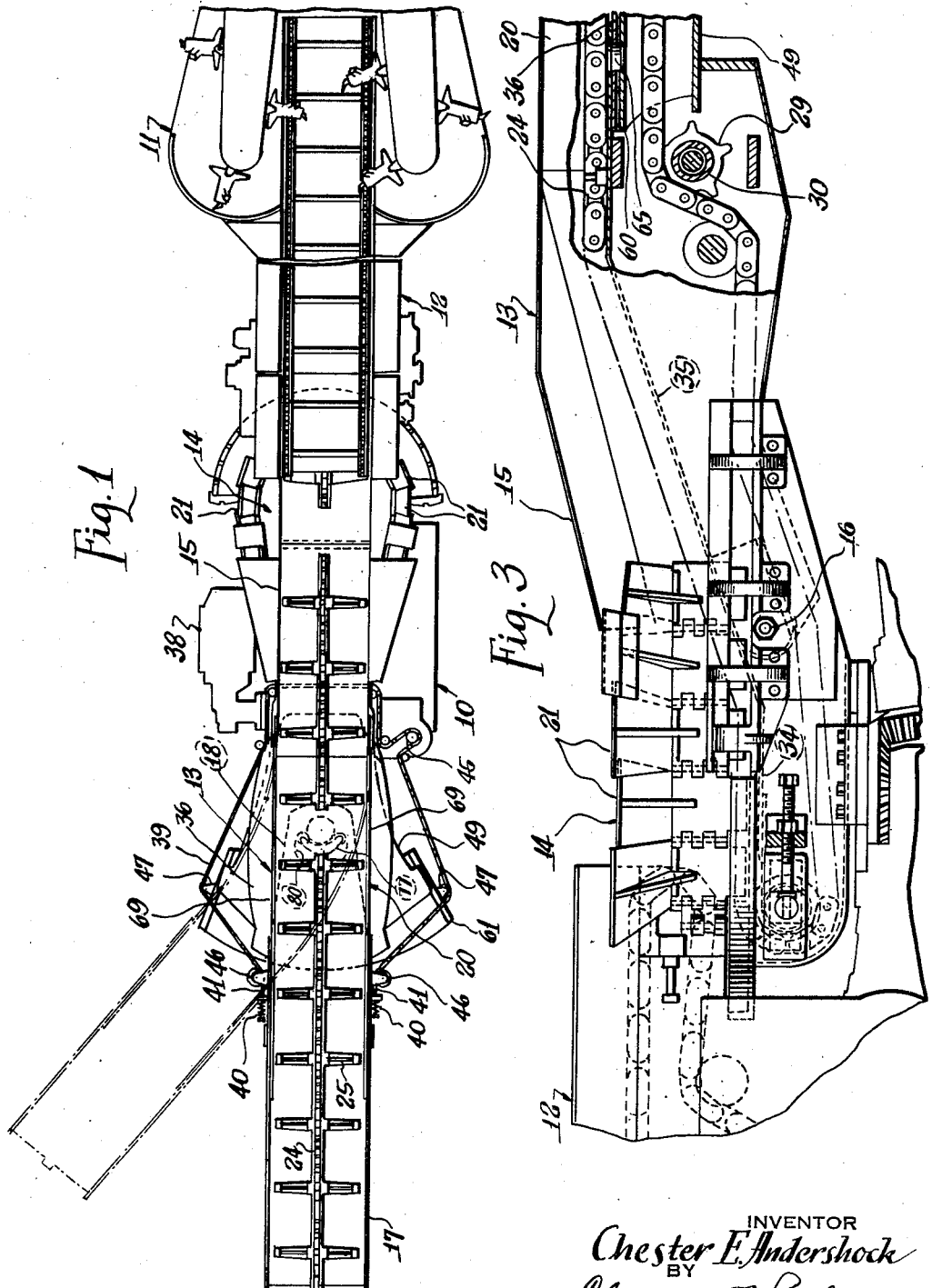

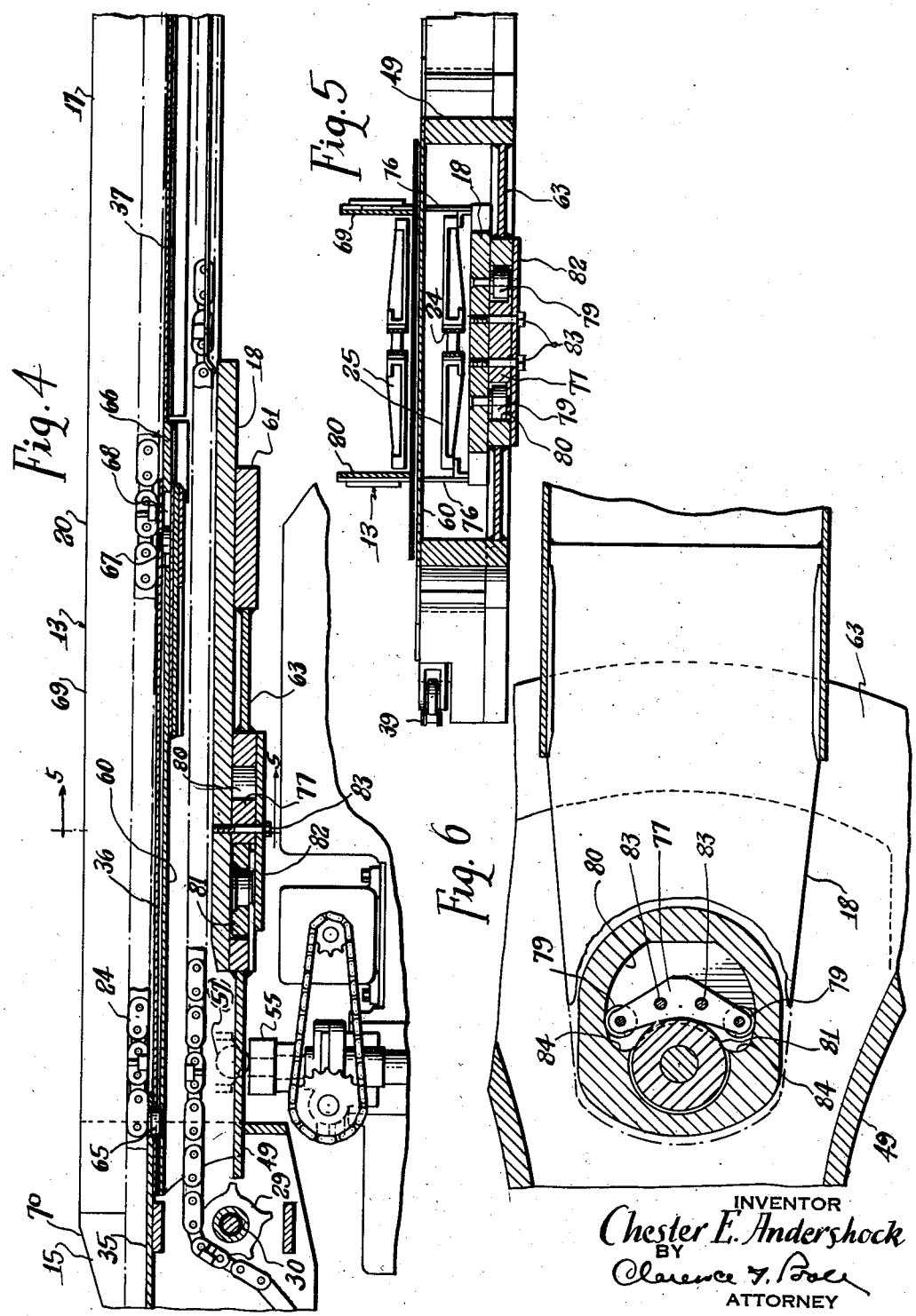

Patented Apr. 16, 1940

2,197,169

UNITED STATES PATENT OFFICE 2,197,169

CONVEYER

Chester E. Andershock, Chicago, Ill., assignor to Goodman Manufacturing Company, Chicago, Ill., a corporation of Illinois Application June 26, 1939, Serial No. 281,127

13 Claims. (Cl. 198—109)

This invention relates to improvements in conveyers, and more particularly to improvements in articulated conveyers of the endless chain and flight type, adapted to be used in loading machines of the type operable in confined spaces, such as mines.

With the single strand endless chain type of articulated conveyer having a laterally swingable discharge section and having flights engaging the side walls of the trough sections of the conveyer, to guide the chain along said trough sections, the path of travel of the chain from one end of one trough section to the opposite end of the other trough section shortens as the discharge end of the conveyer swings to either side of the longitudinal center of the stationary portion of the conveyer. The reason for this is that clearance is provided between the flights and the side walls of the conveyer, and the flights, engaging the flexible side walls of the conveyer as it is swung off center, permit the chain to cut the corner about which the conveyer pivots. This causes slack to form in the chain when the conveyer is positioned to one side or the other of the center line of the machine, with a resultant back lash and frequent breakage thereof, or if the chain is correctly adjusted when the conveyer is in an extreme position of articulation, causes binding when the conveyer is in an aligned position. Spring take-ups for the idler roller of the chain, arranged to yield as the discharge section is swung in alignment with the center line of the stationary section, have heretofore been utilized to remedy this difficulty, but such take-ups are not uniform in action and frequently bind, becoming clogged with dirt, causing the chain to be excessively tight when the two trough sections are in longitudinal alignment with respect to each other, or excessively loose when the conveyer is in an extreme position of articulation.

The principal objects of my present invention are to remedy these difficulties by providing a guiding connection for the horizontally swingable trough section of the conveyer, so arranged that the swingable trough section may move about an arc having a varying radius, to longitudinally move this trough section upon swinging movement thereof, and maintain a uniform tension on the conveyer chain in all positions of articulation of the conveyer.

A more specific object of my invention is to provide a support for the horizontally swingable trough section of the conveyer, disposed beneath said trough section away from any material which may cause fouling or binding, including an irregularly formed guide forming a rocking connection for the movable trough section, and so arranged as to cause said movable trough section to rock about an arc of varying radius to extend or retract said movable trough section with respect to the stationary portion of the conveyer, upon lateral swinging movement of said swingable trough section.

Other objects of my invention will appear from time to time as the following specification proceeds, and with reference to the accompanying drawings wherein:

Figure 1 is a plan view of a loading machine having a conveyer constructed in accordance with my invention embodied therein;

Figure 2 is an enlarged fragmentary plan view showing certain details of the conveyer;

Figure 3 is an enlarged view in side elevation of the forward part of the conveyer, with certain parts shown in longitudinal section;

Figure 4 is a fragmentary longitudinal sectional view of the rear part of the conveyer, drawn to substantially the same scale as Figure 3;

Figure 5 is a transverse sectional view taken substantially along line 5—5 of Figure 4; and Figure 6 is an enlarged detail view, showing certain details of the pivotal mounting for the swinging portion of the conveyer, with certain parts of the conveyer broken away, and certain other parts shown in horizontal section.

In the drawings, the embodiment of my invention illustrated is herein shown as being embodied in a track mounted loading machine of the type particularly adapted for use in gathering and loading coal into cars in mines. Said machine is constructed along lines somewhat similar to those shown and described in a prior application Serial No. 208,969, filed by Frank Cartlidge on May 20, 1938, so will only herein be described in sufficient detail to make my present invention clearly understandable.

The loading machine includes generally a track mounted truck 10 having a gathering and loading element 11 projecting forwardly from the forward end thereof. Said gathering and loading element includes an inclined elevating conveyer 12 mounted on said truck for horizontal and vertical swinging movement with respect thereto, to permit the gathering of material from either side of the track. Said elevating conveyer is arranged in cascade relationship with respect to an articulated discharge conveyer 13, which extends longitudinally of the machine, beyond the rear end thereof.

A receiving end 14 of the discharge conveyer 13 is herein shown as being relatively stationary and of a hopper-like formation, terminating into a forward trough section 15, which extends rearwardly and upwardly from said receiving end. Said forward trough section is pivotally mounted on the truck 10, on a transverse shaft 16, to permit vertical adjustment of the rear end of said discharge conveyer. A rear trough section 17 of said discharge conveyer is spaced rearwardly from said forward trough section and is provided with an inwardly extending arm 18, projecting from the bottom thereof, which forms a supporting and connecting member for mounting said rear trough section for swinging movement in a horizontal plane. An intermediate swinging connecting trough section 20 connects said forward and rear trough sections together, to form a continuous trough from one end of the conveyer to the other.

The hopper-like forward receiving portion 14 of said discharge conveyer, as herein shown, includes a plurality of interconnected segmental side walls 21, 21 which are connected with opposite ends of the discharge end of the elevating conveyer 12 and which are slidably guided for movement about the receiving end of said discharge conveyer, to form a flexible hopper movable about the receiving end of said discharge conveyer. Said hopper is not herein shown or described in detail since it forms no part of my present invention and is clearly described in an application Serial No. 265,103, filed by Frank Cartlidge on March 31, 1939.

The material moving or conveying element of the discharge conveyer 13 is herein shown as being of the continuous center strand chain and flight type and includes an endless chain 24 movable along the central portion of said discharge conveyer and having laterally projecting flights 25, 25 pivotally connected thereto at suitable intervals. As shown in Figure 2, each of said flights is mounted on and projects laterally from opposite sides of a link 26 of said endless chain. Said link is pivotally connected to the chain at its opposite ends by means of links 27, 27 and pivotal pins 28, 28, disposed perpendicular to the plane of travel of the conveyer. This arrangement permits lateral swinging movement of the entire conveying element in a plane perpendicular to its plane of travel, and permits the flights 25, 25, engaging the side walls of the trough sections on their ends, to guide the chain from one trough section to the other, when the conveyer is in various positions of articulation.

The endless chain 24 is trained over and driven from a drive sprocket 29 on a transverse hollow shaft 30. Said endless chain extends from said direction changing member upwardly and rearwardly along a bottom plate 34 of the receiving section 14, along a bottom plate 35 of the trough section 15, a pivoted bottom plate 36 of the intermediate flexible connecting trough section 20, and along a bottom plate 37 of the rear trough section 17, to and around a suitable idler at the rear end thereof, and forwardly from said idler to and over the drive sprocket 29. The transverse shaft 30 and drive sprocket 29 are selectively driven from a motor 38, mounted on a side frame member of the forward trough section 15, in a manner similar to that shown and described in an application filed by Frank Cartlidge on March 31, 1939, Serial No. 265,102, and not herein shown or described since it is no portion of my present invention.

The rear trough section 17 is swung from one side of the truck to the other by a flexible member, such as an endless chain 39, yieldably connected at its free ends to opposite sides of said rear trough section by means of compression springs 40, 40 encircling bolts 41, 41. Said bolts extend through lugs 42, 42 projecting from opposite sides of said rear trough section, and are pivotally connected to opposite sides of said chain.

Said chain is driven from the motor 38, which also serves to drive the sprocket 29 and conveyer. The drive from said motor includes reverse gearing, generally indicated by reference character 44, and a sprocket 45, which meshes with said chain, and is similar to that shown and described in the aforementioned application of Frank Cartlidge, Serial No. 265,102, and is no part of my present invention so is not herein described in detail.

The chain 39 extends forwardly from the lugs 42, 42 around the inner sides of idlers 46, 46, and outwardly therefrom around the outer sides of idlers 47, 47. Said last mentioned idlers are mounted on brackets 48, 48, secured to and projecting laterally beyond the sides of a support frame 49, which forms a support for the swinging portion of the conveyer. From said idlers, said chain is trained in a forwardly direction. The portion of said chain on the side of the machine, which is its left hand side, when looking towards the rear end thereof, is trained around an idler 50 and the drive sprocket 45, and around a tension idler 51. From said tension idler, said chain is trained forwardly and around an idler 52 and transversely across the underside of said trough section, around another idler 52 at the opposite side of said forward trough section, and rearwardly therefrom to and around the inside of an idler 53, on the side of the machine opposite from the drive sprocket 45. The application of power to the sprocket 45 will thus cause swinging movement of said rear trough section in an obvious manner.

The rear end of the discharge conveyer 13 is vertically adjusted about the axis of the transverse shaft 16, by means of suitable laterally spaced adjusting members 55, 55 (see Figure 4). Said members are engaged by and form a support for spaced apart rollers 57, 57 depending from the frame 49, and are vertically moved by power in a manner similar to that shown and described in the aforementioned Cartlidge application Serial No. 208,969, and not herein shown or described since it is no portion of my present invention.

The support frame 49 forms a support for the rear and intermediate trough sections 17 and 20, respectively, and is herein shown as being a rearward extension of the frame for the forward trough section 15. Said frame is preferably of a box-like construction. An upper side 60 of said support frame forms a support for the pivoted bottom plate 36. Said support frame has a widened fan-shaped rear portion 61 of an arcuate formation, along which said intermediate trough section and said rear trough section may swing. The arm 18 and the rear trough section are supported on the upper side of a lower portion 63 of said support frame. Said arm extends inwardly along said lower portion, and a novel form of rocking connection between said arm and frame is provided, which will hereinafter be more clearly described as this specification proceeds.

The movable bottom plate 36, as herein shown, is widened forwardly of the forward end of the forward trough section 15, to provide a surface of sufficient width to form a bottom for the conveyer in all positions of articulation thereof, and underlaps the bottom plate 35 of the forward trough section 15. Said movable bottom plate is pivotally connected to the rear end of the bottom plate 35 and to the upper side 60 of said supporting frame by means of a vertical stud 65, connected between said upper side of said supporting frame and the underside of the bottom plate 35. The rear end of said movable bottom plate overlaps a plate 66, which is herein shown as being secured to and extending forwardly from the forward end of the bottom plate 37 of the rear trough section 17. A stud 67, secured to and depending from the rear end of said movable bottom plate, is slidably mounted in a slot 68 formed in the plate 66 (see Figures 2 and 4). This permits said plate to follow said rear trough section upon swinging movement of said rear trough section with respect to said movable bottom plate, and permits extension or retraction of said rear trough section with respect to said forward trough section.

The side walls of the forward and rear trough sections are connected together by means of a pair of parallel spaced flexible side walls 69, 69, slidably engaging the top surface of the plate 36 at their lower sides, and herein shown as being secured at their forward ends to the rear ends of side walls 70, 70 of the forward trough section 15. The rear ends of said flexible side walls are slidably connected with side walls 71, 71 of the rear trough section 17, in a manner similar to that shown and described in the aforementioned Cartlidge application Serial No. 265,102, and not herein described in detail since it is no part of my present invention.

The endless chain 24, on its return path, passes between the top and bottom portions of the supporting frame 49 and is guided for movement along said frame on the ends of the flights 25, 25 by means of flexible side walls 76, 76, mounted in the hollow portion of said supporting frame. Said side walls are of a form similar to the flexible side walls 69, 69, and are mounted in the frames for the forward and rear trough sections in a manner similar to which the flexible side walls 69, 69 are connected to the side walls 70, 70 and 71, 71, to form a trough shaped guide for the return run of the endless chain 24, when the conveyer is in various positions of articulation (see Figure 5).

Referring now in particular to the novel form of rocking mounting for the rear trough section 17, arranged to vary the radius of the arc of horizontal swinging movement of said trough section in proportion to the increase or decrease in the length of the path of travel of the chain 24, and maintain a uniform tension on said endless chain in all positions of articulation of the conveyer, a cam shaped rocking member 77 is herein shown as depending from the arm 18, adjacent the inner or forward end thereof. Said rocking member, as herein shown, is of an elongated substantially reniform form, having a convex portion facing the receiving end of the conveyer and having suitable anti-friction members, such as rollers 79, 79, on opposite ends thereof. Said member is adapted to extend within a guide 80 formed in the lower portion 63 of the support frame 49, and said rollers are adapted to engage opposite sides of said guide. Said guide is herein shown as being of a substantially reniform form, with a convex portion thereof facing the receiving end of said discharge conveyer. The convex portion of said guide is herein shown as being formed from a portion of the outer face of a suitable anti-friction member, such as a roller 81, which is adapted to be engaged by the concave surface of the member 77, and form an abutment about which said member may rock as the rollers 79, 79 engage opposite sides of said guide. A retaining plate 82 is provided to retain the member 77 in said guide. Said plate abuts the underside of the guide 80 and is secured to the underside of the member 77 by means of cap screws 83, 83, threaded within said member, and the arm 18.

As the rear trough section 17 is swinging to one side or the other of the longitudinal center line of the forward trough section 15, the rollers 79, 79 will engage opposite sides of said guide, and said trough section will initially swing about the surface of engagement of the concave portion of the member 77 with the roller 81. Upon further swinging movement of said rear trough section, one or the other roller 79, depending upon the direction of swinging movement of said trough section, will engage a curved portion 84 of said guide to permit rocking movement of said discharge trough section about a point spaced from the center of said trough section. The initial and extreme positions of said member with respect to said guide are illustrated by dotted lines in Figure 2.

Upon return movement of said movable trough section to a longitudinally aligned position, the member 77 engaging opposite sides of the guide 80 will move said swinging trough section inwardly an amount sufficient to maintain a uniform tension on the chain 24.

The chain 39, when swinging the rear trough section 17 laterally, also tends to pull said trough section towards the receiving end of the conveyer through the springs 40, 40. Said chain accordingly serves to aid in fully retracting the conveyer, especially upon wear of the guide, and also tends to hold the convex portion of the member 77 in engagement with the roller 81. Said springs also permit extension of said discharge trough section as it is swung to an aligned position with respect to the forward trough section 15.

The discharge trough section thus initially rocks about a point disposed adjacent its center and, as it swings to one side or the other of the conveyer, the point about which it rocks gradually moves to a position offset with respect to the center of said member until it reaches an extreme end of said member, to gradually lengthen the radius of the arc about which said discharge section swings. The radius of the arc of swing of said trough section is thus varied in such a manner as to lengthen said trough section as it swings to one extreme side or the other of the conveyer a distance equal to the amount that the path of travel of the chain 24 is shortened, and shorten a similar amount when moving towards the center of the stationary part of the conveyer, to maintain a uniform tension on said chain and prevent either excessive looseness or tension of said chain, when said discharge portion of said conveyer is in various positions of articulation.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In an articulated conveyer, a pair of aligned trough sections, one of which is horizontally swingable with respect to the other, an endless conveyer extending along said trough sections from one end of one trough section to the opposite end of the other, and a connection for said swingable trough section arranged to extend said trough section upon horizontal swinging movement thereof, to maintain a uniform tension on said conveyer during horizontal swinging movement of said movable trough section.

2. In an articulated conveyer, a pair of aligned trough sections, one of which is horizontally swingable with respect to the other, an endless conveyer extending along said trough sections from one end of one trough section to the opposite end of the other and a connection for said swingable trough section arranged to extend or retract said trough section upon horizontal swinging movement thereof, to maintain a uniform tension on said conveyer in all positions of articulation of the conveyer including an irregularly formed guide and a member guided by and having engagement with said guide.

3. In an articulated conveyer, a pair of aligned trough sections, one of which is horizontally swingable with respect to the other, an endless conveyer extending along said trough sections from one end of one trough section to the opposite end of the other and a rocking connection for said swingable trough section arranged to extend said trough section upon horizontal swinging movement thereof, to maintain a uniform tension on said conveyer including an irregularly formed guide and a member associated with said movable trough section adapted to have rocking engagement with said guide.

4. In an articulated conveyer, a pair of aligned trough sections, one of which is horizontally swingable with respect to the other, an endless conveyer extending along said trough sections from one end of one trough section to the opposite end of the other, and a rocking connection for said swingable trough section arranged to extend said trough section upon horizontal swinging movement thereof, to maintain a uniform tension on said conveyer including a frame adapted to form a slidable support for said swingable trough section, a guide associated with said frame, and a member associated with said movable trough section having rocking engagement with said guide.

5. In an articulated conveyer, a pair of aligned trough sections, one of which is horizontally swingable with respect to the other, an endless conveyer extending along said trough sections from one end of one trough section to the opposite end of the other, and an irregularly shaped fulcrum forming a rocking connection for said movable trough section, said fulcrum being so formed as to vary the radius of the arc of swinging movement of said movable trough section and longitudinally move said movable trough section upon horizontal swinging movement thereof, to maintain a uniform tension on said conveyer from one extreme position of articulation to the other.

6. In an articulated conveyer, a pair of spaced apart trough sections, one of which is horizontally swingable with respect to the other, an endless conveyer extending along said trough sections from one end of one trough section to the opposite end of the other, an irregularly shaped guide forming a fulcrum for said movable trough section, and a member guided by said guide, said guide and member being so formed as to vary the radius of the arc of swinging movement of said movable trough section and longitudinally move said movable trough section upon horizontal swinging movement thereof, to maintain a uniform tension on said conveyer in all positions of articulation of the conveyer.

7. In an articulated conveyor, a pair of trough sections, one of which is horizontally swingable with respect to the other, an endless conveyer extending along said trough sections from one end of one trough section to the opposite end of the other, an irregularly shaped guide forming a fulcrum for said movable trough section, and a member having connection with said movable trough section, said member being mounted within and having engagement with said guide, said guide and member being so formed as to vary the radius of the arc of swinging movement of said movable trough section and longitudinally move said movable trough section upon horizontal swinging movement thereof, to maintain a uniform tension on said conveyer in all positions of articulation of the conveyer.

8. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer movable along said trough sections from one end of one trough section to the opposite end of the other, and an irregularly shaped guide forming a slidable guide for said movable trough section, said guide being so formed as to longitudinally move said movable trough section upon lateral swinging movement thereof, to maintain a uniform tension on said conveyer in all positions of articulation of the conveyer.

9. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer movable along said trough sections from one end of one trough section to the opposite end of the other, an irregularly shaped member forming a fulcrum for said movable trough section, and another irregularly shaped member having rocking engagement with said first mentioned member, said members being so formed as to longitudinally move said movable trough section upon lateral swinging movement thereof, to maintain a uniform tension on said conveyer in all positions of articulation of the conveyer.

10. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer movable along said trough sections from one end of one trough section to the opposite end of the other, an irregularly shaped guide forming a fulcrum for said movable trough section, and an irregularly formed engaging member mounted within said guide and having rocking engagement therewith, said guide and member being so formed as to longitudinally move said movable trough section upon lateral swinging movement thereof, to maintain a uniform tension on said conveyer in all positions of articulation of the conveyer.

11. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer moving along said trough sections from one end of one trough section to the opposite end of the other, a reniform guide forming a fulcrum for said movable trough section, and a reniformly formed member mounted within said reniform guide and having rocking engagement therewith, to longitudinally move said movable trough section upon lateral swinging movement thereof, to maintain a uniform tension on said conveyer in all positions of articulation of the conveyer.

12. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer moving along said trough sections from one end of one trough section to the opposite end of the other, an irregularly shaped guide forming a fulcrum for said movable trough section, a member guided within said guide, and an anti-friction member, a portion of the outer periphery of which forms one face of said guide, and which is adapted to be engaged by said member, said guide and member being so formed as to longitudinally move said movable trough section with respect to said stationary trough section upon lateral swinging movement of said movable trough section in such a manner as to maintain a uniform tension on said conveyer in all positions of articulation of the conveyer.

13. In an articulated conveyer, a pair of spaced apart aligned trough sections, one of which is horizontally swingable with respect to the other, each of said trough sections having a pair of parallel spaced side walls, a pair of laterally flexible side walls connecting the gaps between said side walls, a conveyer movable along said trough sections from one end of one trough section to the opposite end of the other, and an irregularly shaped guide forming a fulcrum for said movable trough section, a member mounted within said guide and having slidable engagement therewith, an anti-friction member, a portion of the outer periphery of which forms one face of said guide, and which is adapted to be engaged by said member, and other anti-friction members on the ends of said member adapted to engage said guide, said guide and member being so formed as to extend or retract said movable trough section upon lateral swinging movement thereof, to maintain a uniform tension on said conveyer in all positions of articulation of the conveyer.

CHESTER E. ANDERSHOCK.